(12) United States Patent
Segev et al.

(10) Patent No.: US 9,639,591 B2
(45) Date of Patent: May 2, 2017

(54) LOW LATENCY REPLICATION TECHNIQUES WITH CONTENT ADDRESSABLE STORAGE

(75) Inventors: Yaron Segev, RaAnana (IL); Renen Hallak, Tel-Aviv (IL); Shahar Frank, Ramat-HaSharon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 323 days.

(21) Appl. No.: 13/495,130

(22) Filed: Jun. 13, 2012

(65) Prior Publication Data
US 2012/0317395 A1    Dec. 13, 2012

Related U.S. Application Data

(63) Continuation-in-part of application No. 13/158,498, filed on Jun. 13, 2011.

(51) Int. Cl.
*G06F 12/00* (2006.01)
*G06F 13/00* (2006.01)
(Continued)

(52) U.S. Cl.
CPC .. *G06F 17/30578* (2013.01); *G06F 17/30581* (2013.01)

(58) Field of Classification Search
CPC ............... G06F 17/30578; G06F 17/30581
(Continued)

(56) References Cited

U.S. PATENT DOCUMENTS 6,158,019 A * 12/2000 Squibb ............. G06F 11/1469
714/13

7,672,005 B1 * 3/2010 Hobbs et al. ............ 358/1.15
(Continued)

FOREIGN PATENT DOCUMENTS

| WO | WO 2010/048531 | 4/2010 |
|---|---|---|
| WO | WO 2012/172551 | 12/2012 |
| WO | WO 2012/172553 | 12/2012 |

OTHER PUBLICATIONS

Notification concerning Transmittal of International Preliminary Report on Patentability mailed Jan. 3, 2014, including International Preliminary Report on Patentability and Written Opinion of the International Searching Authority dated Dec. 13, 2013, for International application No. PCT/IL2012/050203; 5 pages; Geneva, Switzerland.

(Continued)

*Primary Examiner* — Sheng-Jen Tsai
(74) *Attorney, Agent, or Firm* — Krishnendu Gupta; Konrad R. Lee

(57) ABSTRACT

A CAS data storage method and apparatus comprising: receiving input data including a succession of data items with corresponding logical addresses at a source CAS data storage space for storage therein and for replication at a destination CAS data storage space, generating a hash key for each data item at the source storage space, comparing respective hash keys with hash keys stored at a hash key storage table, to determine whether respective further data items are already present at the destination storage device; transferring respective data items to the destination storage space if no match is made to a hash key stored at the hash key storage table, but not transferring respective further data items if a match is made to a hash key stored at the hash key storage table, thereby transferring to the destination storage space only unique data items.

15 Claims, 5 Drawing Sheets

(51) Int. Cl.
*G06F 13/28* (2006.01)
*G06F 17/30* (2006.01)

(58) Field of Classification Search
USPC .......................................... 711/216, E12.018
See application file for complete search history.

(56) References Cited

U.S. PATENT DOCUMENTS

| | | | | |
|---|---|---|---|---|
| 7,680,998 | B1* | 3/2010 | Auchmoody | G06F 17/30191 |
| | | | | 707/648 |
| 7,734,603 | B1* | 6/2010 | McManis | 707/696 |
| 7,761,425 | B1* | 7/2010 | Erickson et al. | 707/649 |
| 7,788,220 | B1 | 8/2010 | Auchmoody et al. | |
| 7,831,562 | B1* | 11/2010 | DeVos | 707/640 |
| 7,958,101 | B1 | 6/2011 | Teugels et al. | |
| 8,321,380 | B1* | 11/2012 | Leverett | 707/660 |
| 8,621,166 | B1* | 12/2013 | Chatterjee et al. | 711/162 |
| 9,009,402 | B2* | 4/2015 | Segev | G06F 11/1448 |
| | | | | 711/108 |
| 2004/0162885 | A1* | 8/2004 | Garg | G06F 17/30575 |
| | | | | 709/213 |
| 2005/0038964 | A1* | 2/2005 | Hooper | G06F 12/0842 |
| | | | | 711/143 |
| 2006/0095741 | A1* | 5/2006 | Asher | G06F 9/3004 |
| | | | | 712/225 |
| 2010/0174919 | A1* | 7/2010 | Ito et al. | 713/192 |
| 2011/0066628 | A1* | 3/2011 | Jayaraman | 707/758 |
| 2012/0124012 | A1* | 5/2012 | Provenzano et al. | 707/692 |
| 2012/0158709 | A1* | 6/2012 | Gaonkar et al. | 707/723 |
| 2013/0036289 | A1* | 2/2013 | Welnicki et al. | 711/173 |
| 2014/0082273 | A1* | 3/2014 | Segev | G06F 11/1448 |
| | | | | 711/108 |

OTHER PUBLICATIONS

International Search Report and the Written Opinion Dated Oct. 5, 2012 From the International Searching Authority Re.: Application No. PCT/IL2012/050205.

International Search Report and the Written Opinion Dated Oct. 8, 2012 From the International Searching Authority Re. Application No. PCT/IL2012/050203.

* cited by examiner

| | Address | Hash |
|---|---|---|
| 0 | 4554 | 317FF |
| 1 | 7053 | 84918 |
| 2 | 3008 | 3A1962E |
| 3 | 4519 | 317FF |
| 4 | 3037 | 5879EA6 |
| 5 | 8990 | 42A17BD |

FIG. 3

|   | Hash | Physical Address of Data |
|---|------|--------------------------|
| 0 | 317FF | 344F |
| 1 | 84918 | 3450 |
| 2 | 3A1962E | 3451 |
| 3 | 78E543 | 3452 |
| 4 | 5879EA6 | 3453 |
| 5 | 42A17BD | 3454 |
|   |       |      |

LOW LATENCY REPLICATION TECHNIQUES WITH CONTENT ADDRESSABLE STORAGE

RELATED APPLICATION

This application is a Continuation-In-Part (CIP) of U.S. patent application Ser. No. 13/158,498 filed on Jun. 13, 2011, The contents of which are incorporated herein by reference as if fully set forth herein.

FIELD AND BACKGROUND OF THE INVENTION

The present invention, in some embodiments thereof, relates to replication techniques with content addressable storage, and, more particularly, but not exclusively to a system and method for reducing the latency and amount of data transfer during replication, in a content addressable storage system.

Content addressable storage, CAS, also referred to as associative storage, is a mechanism for storing information that can be retrieved based on the content rather than on the storage location. CAS is typically used for storage and retrieval of fixed content and for archiving or permanent storage.

In Content Addressable Storage, the system records a content address, a key that uniquely identifies the information content. A hash function is typically used as the key to identify the data content, and the quality of the system depends on the quality of the hash function. Too weak a hash function may lead to collisions between different content items.

A typical CAS storage space has access nodes through which input and output is handled and storage nodes for permanent storage of the data, and CAS metadata allows for content addressing and retrieval within the system.

Often the storage space requires to be backed up, and thus a replication of the source space is constructed at a destination location. The source and destination spaces are often not located physically together and there may be bandwidth limitations and latency involved in communication between the two. For the purpose of replication, nodes at the storage space are required to provide consistent copies of input data to the destination, and any system has to allow for failures at one location or another in a way that takes account of the latency within the system. Two close-together operations on the same data may otherwise result in inconsistent replication.

It is furthermore desirable to avoid unnecessary data transfer in view of limitations on bandwidth.

It is noted that a CAS storage space as considered here may be a system that is internally a CAS system but looks like a standard data storage block to external applications. That is to say, CAS metadata such as hashes are not generally available to externally to the memory block.

SUMMARY OF THE INVENTION

According to an aspect of some embodiments of the present invention there is provided a CAS data storage system comprising:
at least one source CAS data storage space,
a destination CAS data storage space, and
a communication line connecting the source storage space and the destination storage space, wherein input data for storage in the system arrives at the source storage space for storage in the source storage space and replication in the destination storage space, and wherein a hash key of a data item is generated at the source storage space, the source storage space comprising:
a hash key storage table configured to store respective generated hash keys in the source storage space to indicate that the respective data item is stored at the destination storage space, and
a hash key inspection unit configured to compare hash keys stored at the hash key storage table against hash keys generated from further data items arriving at the source storage space to determine whether respective further data items are already present at the destination storage device, the source storage system configured to transfer respective further data items if no match is made to a hash key stored at the hash key storage table, but not to transfer respective further data items if a match is made to a hash key stored at the hash key storage table, thereby only transferring unique data items.

In an embodiment, the hash key storage table is configured with an index field to hold for each stored hash key an index indicating a number of times the respective hash is currently replicated at the destination storage space, the index field being incremented or decremented respectively each time a corresponding data item is written or deleted.

In an embodiment, each incoming data item is associated with a logical address, the source storage space and destination storage spaces respectively further comprising an address to hash table to store the generated hash keys together with corresponding logical addresses; and
each unique data item transferred is associated with a physical storage address at the destination storage space, the destination storage space comprising a hash to physical table to store the generated hash keys together with respective physical storage addresses.

In an embodiment, if the match is made between a hash key of a respective incoming data item and a hash key in the hash key storage table so that a respective data item is not unique and is not transferred to the destination storage space, then a respective corresponding logical address is transferred to the destination storage device together with the respective hash key for storage in the destination storage space address to hash table.

In an embodiment, data transfer between the source storage space and the destination storage space is asynchronous. Alternatively, data transfer between the source storage space and the destination storage space may be synchronous, and the present invention is applicable equally to both synchronous and asynchronous cases.

In an embodiment, the source storage space is configured to generate hash keys corresponding to data items such that identical data items correspond to identical hash keys but non-identical data items correspond to non-identical hash keys.

According to a second aspect of the present invention there is provided a CAS data storage method comprising:
receiving input data including a succession of data items with corresponding logical addresses at a source CAS data storage space for storage therein and for replication at a destination CAS data storage space,
generating a hash key for each data item at the source storage space,
comparing respective hash keys with hash keys stored at a hash key storage table at the source storage space, to determine at the hash key storage space whether respective further data items are already present at the destination storage device;

transferring respective data items to the destination storage space if no match is made to a hash key stored at the hash key storage table, but not transferring respective further data items if a match is made to a hash key stored at the hash key storage table, thereby transferring to the destination storage space only unique data items.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. The data processor may include a volatile memory for storing instructions and/or data and/or a non-volatile storage, for example, a magnetic hard-disk, flash memory and/or removable media, for storing instructions and/or data. A network connection may be provided and a display and/or a user input device such as a keyboard or mouse may be available as necessary.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is a simplified diagram showing an address to hash table for use in the embodiment of FIG. 1;

FIG. 4 is a simplified diagram showing a hash to physical table for use in the embodiment of FIG. 1.

DESCRIPTION OF SPECIFIC EMBODIMENTS OF THE INVENTION

Figure 1:
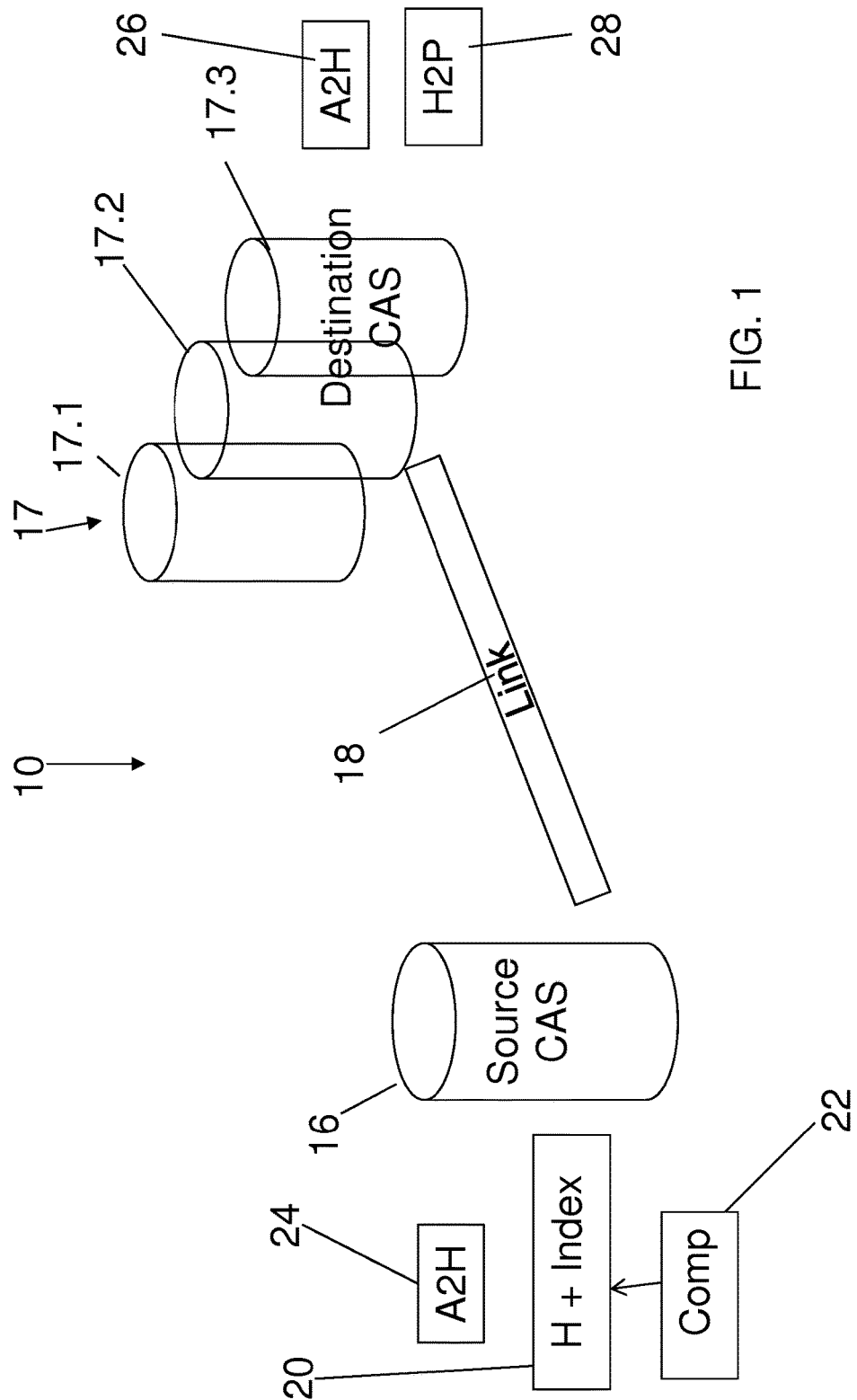
FIG. 1 is a simplified block diagram showing a CAS storage system according to an embodiment of the present invention, including a source CAS, a destination CAS, a link and data storage tables for each CAS.

The present invention, in some embodiments thereof, relates to replication techniques with content addressable storage and, more particularly, but not exclusively to a system and method for reducing the latency and amount of data transfer during replication, in a content addressable storage system.

U.S. patent application Ser. No. 13/158,458, from which priority is presently claimed, teaches a CAS system in which a hash key is obtained of data to be replicated. The hash key, or hash result, is sent to the replication location, which looks to see if the hash is already present. If the hash key is already present at the destination then the actual data to be replicated is not sent. Thus considerable bandwidth is saved by reducing unnecessary sending of data.

The above teaching requires sending the hash, and the full data must either wait until the hash is acknowledged not to be present or is transmitted anyway and is aborted if and when the hash acknowledgement indicates that the full data is not needed. The need for a hash acknowledgement creates a round trip latency or alternatively leads to unnecessary use of bandwidth if the data transmission was started directly. The present embodiments seek to reduce the latency, and avoid transmitting data which is already present at the destination, by keeping a table at the source of the hash keys that have been sent to the destination. Thus any decision on whether to transmit the full data or not can be made immediately by referring to the local table, without the need to wait for a reply from the destination.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified block diagram showing a CAS data storage system 10. The system comprises a source CAS data storage space 16, a destination CAS data storage space 17, here shown as separate storage units 17.1 . . . 17.3, and a link 18. Data arriving at the source is stored and generally utilized at the source but is also replicated at the destination. The link may be of any length but is often relatively long, as the destination system may be physically in a different city or even a different country. The use of the link adds appreciable latency into the system, so that at any given time the source and destination differ because some data has been updated at the source but not at the destination.

Input data for storage in the system arrives at the source storage space and is indeed stored at the source. At the same time hash keys are generated for individual data items. The hash keys are set in accordance with the data item sizes of the specific system, to be unique for the data content, so that if two identical data items, or strings, are hashed, they receive identical hash keys, but if two non-identical strings are hashed, they receive non-identical hash keys.

Source CAS data storage space 16 has a hash index table 20 or hash key storage table, which stores each unique generated hash key once only at the source storage space together with an index which is incremented for every subsequent appearance of the given string. Likewise the hash key index may be decremented for a deletion of the given string. The hash key index may be seen as a reference count indicating the number of times a certain hash is expected to reside in the destination storage space. Thus a particular hash key being in the table with a positive index indicates that the corresponding data item is currently stored somewhere in the destination storage space and does not actually need to be transferred. In cases of multiple destination storage spaces, a separate index may be kept for each destination, each indicating the current number of instances in which a hash was replicated to this destination.

Figure 2:
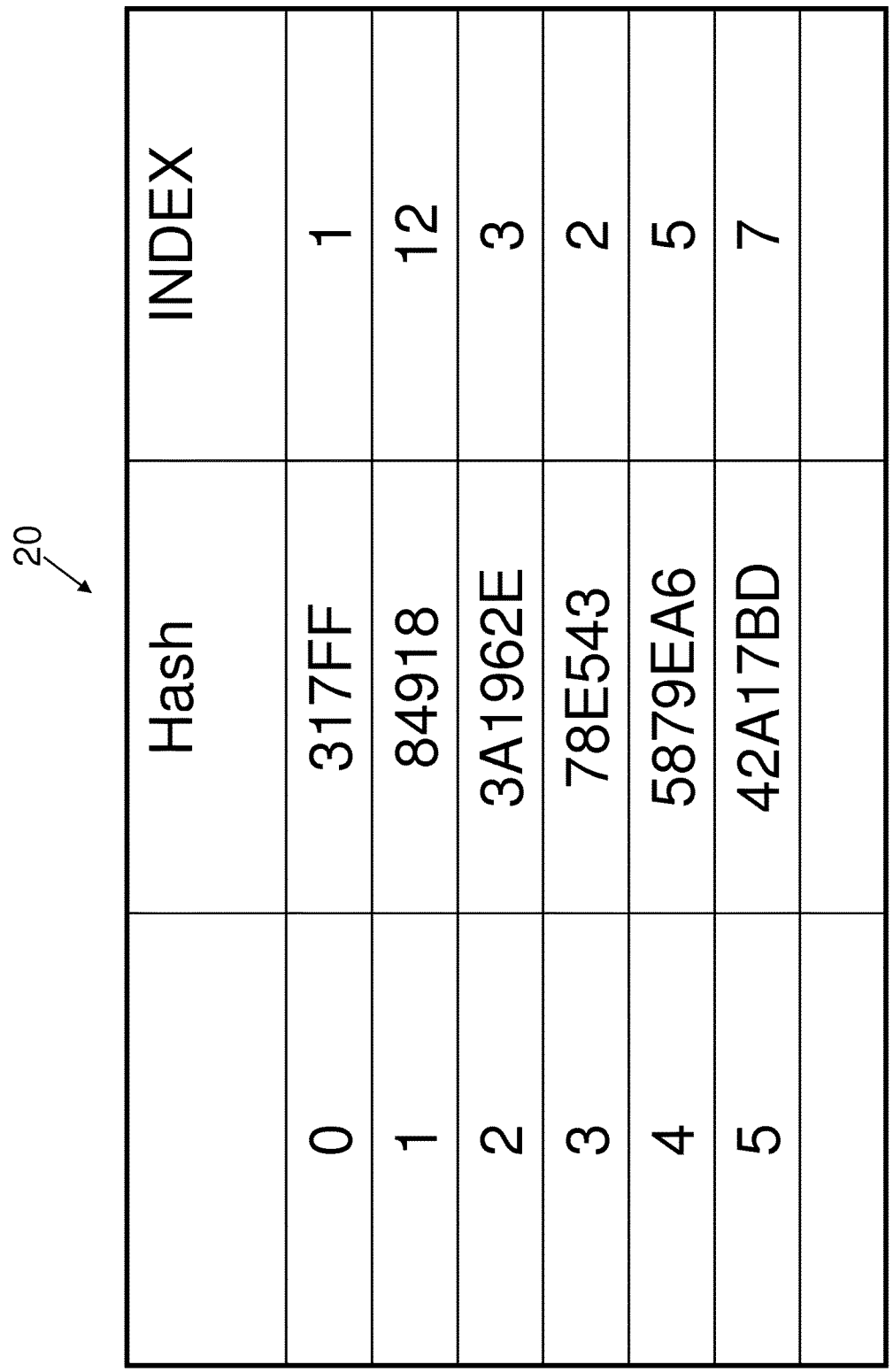
FIG. 2 is a simplified diagram showing a hash index table for use in the embodiment of FIG. 1.

An exemplary hash index table 20 is shown in greater detail in FIG. 2. As shown the hashes are stored alongside an index indicating how many times the corresponding data item appears in the data at the destination storage space. It should be noted that this counts only the hashes which originated from this source. Thus, the actual number of occurrences of a specific hash at the destination may be larger than or equal to this index. In a specific embodiment, the destination storage space may educate the source regarding hashes which were written from other sources. In this case the destination must not delete a hash and its respective data before notifying the source that this hash's reference count has gone down to zero.

A hash key inspection unit or comparator 22 compares the latest generated hash keys against hash keys in the table 20 with the positive indices, and is thus able to determine whether the corresponding data items are already present at the destination storage device. If the data is already present then there is no need to forward the data item itself. It is sufficient to forward the logical address and the hash. If the hash is not matched with any in the table then a full data transfer is required, of logical address and the data itself. Note that if the full data is transferred then there is no need to transfer the hash, as this can be generated independently at the destination. Alternatively, the hash may be sent to reduce the computational load on the destination. The result is that only unique data items are actually transferred to the destination. If the data item is not unique then a logical address and hash are transferred, and the determination about whether the data item is unique or not is made directly at the source without incurring any latency due to the link or destination systems.

As mentioned, each incoming data item is associated with a logical address, and both the source storage space and the destination storage spaces include address to hash tables, A2H, 24 and 26 which store the generated hash keys together with the corresponding logical addresses.

An exemplary address to hash table 26 is shown in FIG. 3, where a series of hashes in one column are associated with logical addresses in the data. It is noted that the same hash may appear several times in the address to hash table.

At the destination, each unique data item transferred is associated with a physical storage address at the destination storage space, where indeed the data item is stored once and once only. The destination storage space includes a hash to physical table 28 which stores the generated hash keys together with respective physical storage addresses.

FIG. 4 illustrates an exemplary hash to physical (H2P) table 28. In the H2P table the various hash values are associated with physical addresses in which the data item corresponding to the hash is stored. Unlike in the address to hash table, hashes in the hash to physical table appear only once.

Storage at the destination includes all the logical addresses that are in use, each associated with a corresponding hash in the A2H table 26, so that in this table, any hash used multiple times will appear multiple times, once for each address that uses it. All the hashes in the A2H table appear just once in the H2P table 28 together with a physical address value which can be looked up to find the data itself.

The hash index table 20 at the source is in a sense an independent replica of the H2P table 28 at the destination, as it too includes each hash just once. The table is independent in the sense that it gets its data from the incoming generated hashes and does not need to consult the destination. Hash index table 20 differs from the H2P table 28 in that it includes an index and does not include the physical addresses at the destination, which of course are not known at the source. It may also keep the physical address at the source as well as the number of local reference counts present as part of this table. Note that in the case where an entire source storage space is replicated to a single destination the local and destination reference counts coincide.

If the matching finds a hash in the hash index table 20 then of course there is no need to transfer the physical data as it already exists at the destination. However the destination has to be told to associate the given hash with the logical address of the current data. Thus the logical address is transferred to the destination storage device together with the hash key and stored in the address to hash table 26.

Data transfer between the source storage space and the destination storage space may be synchronous or asynchronous. In the synchronous case full round trip delays are often necessary as acknowledgement from the destination is generally needed before the write may be acknowledged. In the case of asynchronous replication the write may be acknowledged before replication is performed.

Figure 5:
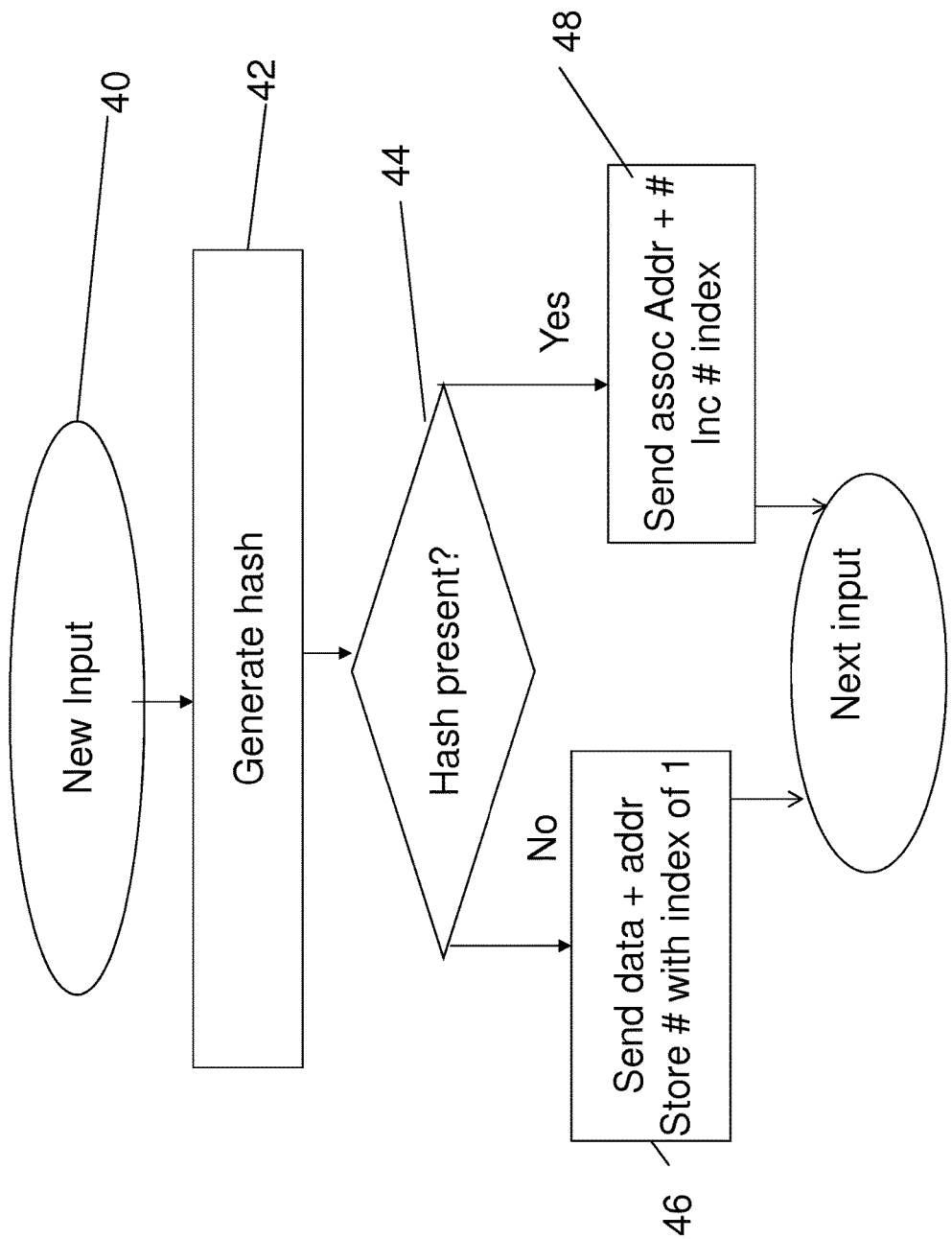
FIG. 5 is a simplified diagram showing a flowchart of operation of the embodiment of FIG. 1.

Reference is now made to FIG. 5, which is a simplified flow diagram illustrating a CAS data storage method according to the present embodiments. In the method a new input is received, 40, which is typically part of a succession of data items with corresponding logical addresses. The new input is received at the source CAS data storage space for storage and use, and also for replication at the destination CAS data storage space, as discussed above.

In stage 42, a hash key is generated for each new data item at the source storage space.

In stage 44, a comparison is made to compare the newly generated hash keys with hash keys already stored in the hash index table, to determine whether the new data items are already present at the destination storage device.

If no match is made, 46, then the data items are themselves transferred to the destination storage space, together with the logical address. The hash is then stored at the local hash index table with an index of 1, to indicate that the corresponding data is stored at the destination and appears once in the data.

If a match is made, 48, then only the hash and logical address are transferred and the index in the hash index table is incremented by one. The index field may also be decremented each time a corresponding data item is deleted or overwritten.

As mentioned above, only unique data items are actually transferred to the destination, saving bandwidth, and the decision on transfer is carried out without any need to check with the destination, thus reducing latency by one round trip delay.

It is expected that during the life of a patent maturing from this application many relevant pulse shaping and symbol decoding technologies will be developed and the scope of the corresponding terms in the present description are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

Certain features of the invention, which are, for clarity, described in the context of separate embodiments, are clearly understood by the skilled person to also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A CAS data storage system comprising:
   at least one source CAS data storage space,
   a destination CAS data storage space, and
   a communication line connecting said source storage space and said destination storage space, wherein input data for storage in said system arrives at said source storage space for storage in said source storage space and replication in said destination storage space, and wherein a hash key of a data item is generated at said source storage space, said source storage space comprising:
   a hash key storage table configured to store respective generated hash keys in said source storage space to indicate that said respective data item is stored at said destination storage space, wherein the hash key storage table is enabled to contain multiple indexes indicating which destination storage device is associated with respective generated hash keys and data associated with each respective generated hash key, wherein the hash key storage at the source storage space is enabled to provide determination of whether data is stored at the destination storage device; and
   a hash key inspection unit configured to compare hash keys stored at said hash key storage table against hash keys generated from further data items arriving at said source storage space to determine whether respective further data items are already present at said destination storage device, wherein if a match is made an associated data item is present at said destination storage device and the associated data item is not unique to said destination storage device, said source storage system configured to transfer respective further data items if no match is made to a hash key stored at said hash key storage table, but not to transfer respective further data items if a match is made to a hash key stored at said hash key storage table, thereby only transferring unique data items;
   wherein the hash key inspection unit is enabled to compare hash keys and make a determination to send an associated data item without communicating with the destination storage device;
   wherein said source storage space is enabled to utilize write folding on data determined to be sent to the destination storage space.

2. The CAS data storage system of claim 1, wherein said hash key storage table is configured with an index field to hold for each stored hash key an index indicating a number of times said respective hash is currently replicated at said destination storage space, said index field being incremented or decremented respectively each time a corresponding data item is written or deleted.

3. The CAS data storage system of claim 1, wherein:
   each incoming data item is associated with a logical address, the source storage space and destination storage spaces respectively further comprising an address to hash table to store said generated hash keys together with corresponding logical addresses; and
   each unique data item transferred is associated with a physical storage address at said destination storage space, said destination storage space comprising a hash to physical table to store said generated hash keys together with respective physical storage addresses.

4. The CAS data storage system of claim 3, wherein, i f said match is made between a hash key of a respective incoming data item and a hash key in said hash key storage table so that a respective data item is not unique and is not transferred to said destination storage space, then a respective corresponding logical address is transferred to said destination storage device together with said respective hash key for storage in said destination storage space address to hash table.

5. The CAS storage system of claim 1, wherein data transfer between said source storage space and said destination storage space is asynchronous.

6. The CAS storage system of claim 1, wherein data transfer between said source storage space and said destination storage space is synchronous.

7. The CAS data storage system of claim 1, wherein said source storage space is configured to generate hash keys corresponding to data items such that identical data items correspond to identical hash keys but non-identical data items correspond to non-identical hash keys.

8. A CAS data storage method comprising:
   receiving input data including a succession of data items with corresponding logical addresses at a source CAS data storage space for storage therein and for replication at a destination CAS data storage space,
   generating a hash key for each data item at said source storage space,
   comparing respective hash keys with hash keys stored at a hash key storage table at said source storage space, to determine at said hash key storage space whether respective further data items are already present at said destination storage device, wherein if a match is made an associated data item is present at said destination storage device and the associated data item is not unique to said destination storage device; wherein the hash key storage table is enabled to contain multiple indexes indicating which destination storage device is associated with respective generated hash keys, wherein the hash key storage at the source storage space is enabled to provide determination of whether data is stored at the destination storage device;

wherein comparing respective hash keys and making a determination to send an associated data item is enabled to be completed without communicating with the destination storage device wherein said source storage space is enabled to utilize write folding on data determined to be sent to said destination storage space; and transferring respective data items to said destination storage space if no match is made to a hash key stored at said hash key storage table, but not transferring respective further data items if a match is made to a hash key stored at said hash key storage table, thereby transferring to said destination storage space only unique data items.

9. The CAS data storage method according to claim 8, wherein:

if no match is made of a respective incoming data item hash key to a hash key stored at said hash key storage table, then said respective incoming data item hash key is stored at said hash key storage table along with said transferring and associated with an index, said index being set at unity to indicate that said hash key is present once at said destination storage space; and if a match is made then a corresponding associated index is incremented, thereby to provide, for each stored hash key, an index indicating a number of times said respective hash is currently replicated at said destination storage space, said index field further being decremented each time a corresponding data item is deleted.

10. The CAS data storage method of claim 8, further comprising providing the source storage space and destination storage spaces respectively with an address to hash table to store said generated hash keys together with corresponding logical addresses.

11. The CAS data storage method of claim 8 comprising associating each unique data item transferred to said destination storage space with a physical storage address at said destination storage space, and providing said destination storage space with a hash to physical table to store said generated hash keys together with respective physical storage addresses.

12. The CAS data storage method of claim 10, wherein, if said match is made between a hash key of a respective incoming data item and a hash key in said hash key storage table so that a respective data item is not transferred to said destination storage space, then a respective corresponding logical address is transferred to said destination storage device together with said respective hash key for storage in said destination storage space address to hash table.

13. The CAS data storage method of claim 8, wherein data transfer between said source storage space and said destination storage space is asynchronous.

14. The CAS data strange method of claim 8, wherein data transfer between said source storage space and said destination storage space is synchronous.

15. The CAS data storage method of claim 8, wherein said source storage space is configured to generate hash keys corresponding to data items such that identical data items correspond to identical hash keys but non-identical data items correspond to non-identical hash keys.

* * * * *